Figures 1, 2:
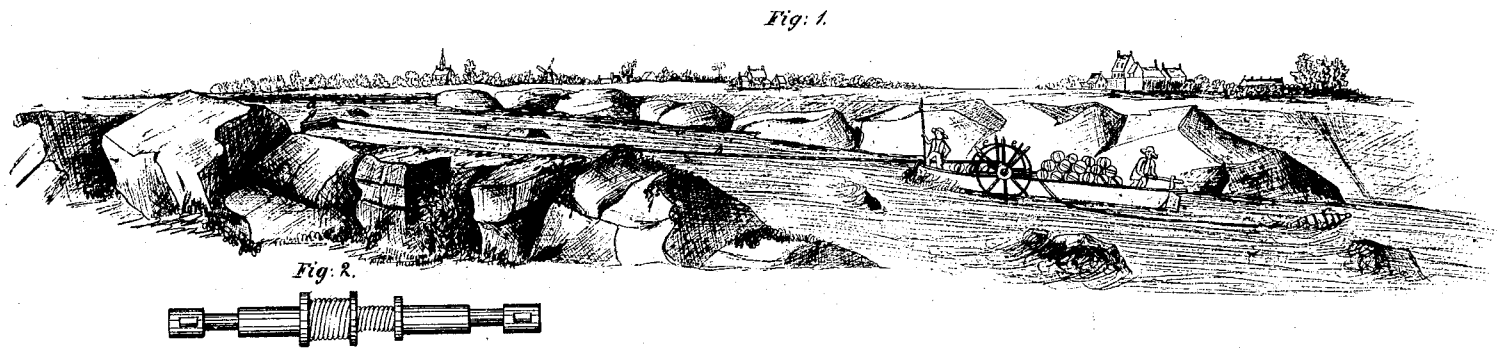

3720X

E. Clark,

Paddle Wheel.

Patented June 25, 1823.

N. PETERS, PHOTO-LITHOGRAPHER, WASHINGTON, D. C.

MISSING PAGE TEMPORARY NOTICE

PATENT # 3720X FOR ISSUE DATE 6-25-1823

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text